United States Patent [19]

Glen et al.

[11] Patent Number: 4,755,352

[45] Date of Patent: Jul. 5, 1988

[54] SYSTEM OF GENERATING ELECTRICITY USING A SWIMMING POOL TYPE NUCLEAR REACTOR

[75] Inventors: John S. Glen, Deep River; Henry W. Hinds, Buchanan, both of Canada

[73] Assignee: Atomic Energy of Canada Limited, Ottawa, Canada

[21] Appl. No.: 734,144

[22] Filed: May 15, 1985

[51] Int. Cl.$^4$ .............................................. G21C 1/14
[52] U.S. Cl. .................................... 376/404; 376/328; 376/403; 60/644.1; 60/671
[58] Field of Search ............... 376/328, 336, 402, 403, 376/404, 219; 60/644.1, 651, 655, 671

[56] References Cited

U.S. PATENT DOCUMENTS

| | | | |
|---|---|---|---|
| 2,874,109 | 2/1959 | Cooper | 376/328 |
| 3,120,471 | 2/1964 | Koutz et al. | 376/404 |
| 3,285,824 | 11/1966 | Ageron | 376/403 |
| 3,308,032 | 3/1967 | Berthod | 376/403 |
| 3,977,196 | 8/1976 | Sedille | 60/655 |
| 4,232,525 | 11/1980 | Enjo et al. | 60/671 |
| 4,279,697 | 7/1981 | Overhoff et al. | 376/336 |
| 4,422,298 | 12/1983 | Nozawa | 60/655 |
| 4,542,625 | 9/1985 | Bronicki | 60/655 |

OTHER PUBLICATIONS

Barber, "Potential of Rankine Engs. to Produce Power from Waste Heat Streams", 9th Intersociety Energy Conv. Eng. Conf., Aug., 1974.
Glen et al., "The Canadian Slowpoke Heating Reactor," IETE Workshop, Dec. 1983.
IEEE Spectrum, "Low Temperature Reactors for Space Heating," pp. 50–55, Feb., 1984.
Glen, "Nuclear Elec. from A Low–Temp. Organic Rankine Cycle Engine," Conf. of the Canadian Soc. for Mech. Eng., May, 1984.

Primary Examiner—Deborah L. Kyle
Assistant Examiner—Richard L. Klein
Attorney, Agent, or Firm—Yoshiharu Toyooka

[57] ABSTRACT

A system of generating electricity is disclosed. The system employs a new kind of swimming pool type nuclear reactor which is safe and can be made operable unattended but at the same time raises the mean pool temperature by forcing moderator-coolant-shield circulation. When the reactor is combined with an organic Rankine cycle engine, a significant improvement in efficiency of electricity generation can be obtained, making very small nuclear/electricity units economically viable.

5 Claims, 6 Drawing Sheets (SLOWPOKE 3)

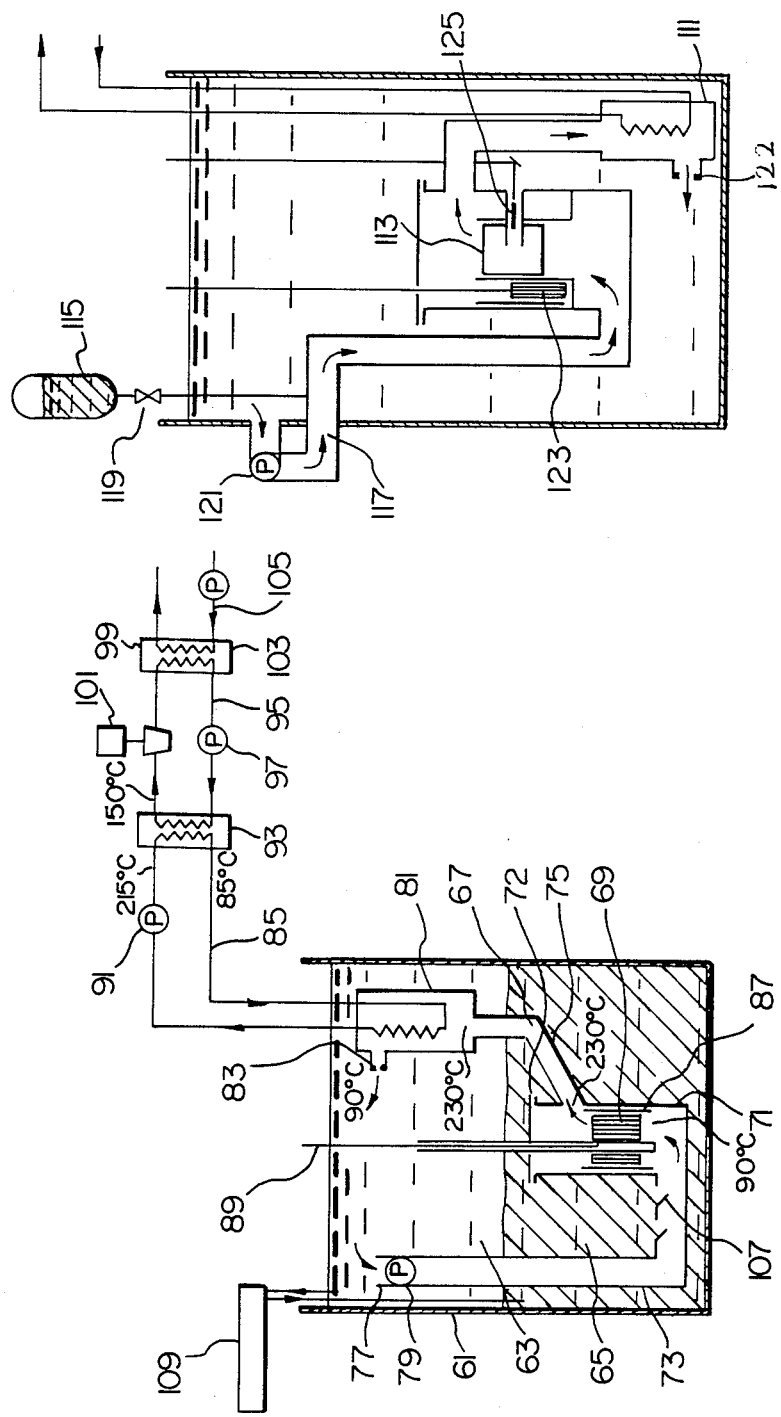

SYSTEM OF GENERATING ELECTRICITY USING A SWIMMING POOL TYPE NUCLEAR REACTOR

The present invention relates to a system of generating electricity by the use of a swimming pool type nuclear reactor. In particular, the invention is directed to an electricity generating system using a swimming pool type reactor which employs a forced circulation of the coolant-moderator by a pump in order to raise the operating temperature of a turbine-generator fluid.

BACKGROUND OF THE INVENTION

The swimming pool type nuclear reactors are well known and their uses for the purpose of producing heat have been widely proposed. IEEE Spectrum, February 1984 pp. 50-55 describes various proposals of the use of low temperature nuclear reactors for space heating. Most of the reactors described in the above article use closed circuit moderator-coolant flows which are pressurized throughout. The Canadian Slowpoke reactor which is also mentioned in the article is open circuited in that it has a pool of light water under atmospheric pressure as a part of the circuit.

The present inventor co-authored a paper presented at the technical committee meeting and workshop of International Atomic Energy Agency held at Krakow, Poland on Dec. 5-9. 1983. The paper describes the prototype 2MWt Slowpoke-3 heating reactor concept. The present inventor also presented an article "Nuclear electricity from a low-temperature organic Rankine cycle engine" at the 1984 Annual Conference of the Canadian Society for Mechanical Engineering, Halifax, Nova Scotia, May 23-25, 1984. It was proposed there that a pumped Slowpoke reactor results in a higher mean temperature supplied to the Rankine engine. An intermediate water loop is used in both circuits to avoid any Freon [Trademark] entering the reactor pool.

U.S. Pat. No. 3,308,032, Mar. 7, 1967 (Berthod) teaches swimming pool type reactors in which an independent cooling water circulation system is set up within the body of the swimming pool water to limit surface radioactivity from nitrogen 16. By the use of suitable guides and/or pressure distribution arrangements e.g. baffles etc in the pool, independent cooling water circulation system which includes a pump will ensure that the cooling water will flow according to a definite pattern in one direction or the other through the core and the body of the pool water. The patent fails to concern itself with increasing the mean temperature of the coolant-moderator or mention electricity generation with its associated problems.

U.S. Pat. No. 3,769,789, Nov. 6, 1973 (Niggermann) discloses a power conversion system employing a Rankine cycle engine wherein an organic fluid such as toluene is used as the working medium. The system uses gas combustion at a temperature of about 3000° F. which heats the toluene to produce superheated vapour of about 700° F. The superheated vapour drives a turbine to produce electricity.

OBJECT OF THE INVENTION

It is an object of the present invention to provide a thermodynamic system which converts heat energy produced in a nuclear reactor to electricity.

It is another object of the present invention to provide a thermodynamic system which converts heat energy produced by a swimming pool type nuclear reactor to electricity.

It is a further object of the present invention to provide a thermodynamic system wherein a swimming pool type nuclear reactor is used for producing heat and an organic Rankine cycle engine is used for converting the heat to electricity.

SUMMARY OF THE INVENTION

Briefly stated, the present invention makes use of an organic fluid having a low boiling temperature contained in a Rankine cycle engine in order to take advantages of inherently safe swimming pool type nuclear reactors and thereby convert heat to electricity.

According to the present invention, a thermodynamic system for converting heat produced by a swimming pool type reactor to a more useful form of energy includes a pool containing light water functioning as the moderator-coolant-shielding for the reactor and being open to the atmospheric pressure. The system further includes moderator-coolant passage means and a nuclear reactor core in the passage means. The passage means has an intake end and a discharge end and defines a flow of the moderator-coolant between the ends, both of which are positioned in the pool. Pump means are provided in the passage means at near the intake end and draws the light water from the pool and circulates it under pressure through the passage means and back to the pool by the discharge end. The system is equipped with a primary heat exchanger in the passage means between the core and the discharge end to transfer heat energy of the light water to a heat exchanger fluid contained in a secondary circuit. Boiler means are provided in the secondary circuit to heat an organic fluid contained in a turbine circuit which includes turbine means to be driven by the heated organic fluid to drive an electric generator.

BRIEF DESCRIPTION OF THE DRAWINGS

For more complete understanding of the present invention and for further objects and advantages thereof, references may now be made to the following description taken in conjunction with the accompanying drawings in which.

FIG. 7 schematically shows another preferred embodiment of the present invention.

FIG. 8 is a schematic drawing of still another preferred embodiment of the present invention.

DETAILED DESCRIPTION OF THE PREFERRED EMBODIMENTS

Figure 1:
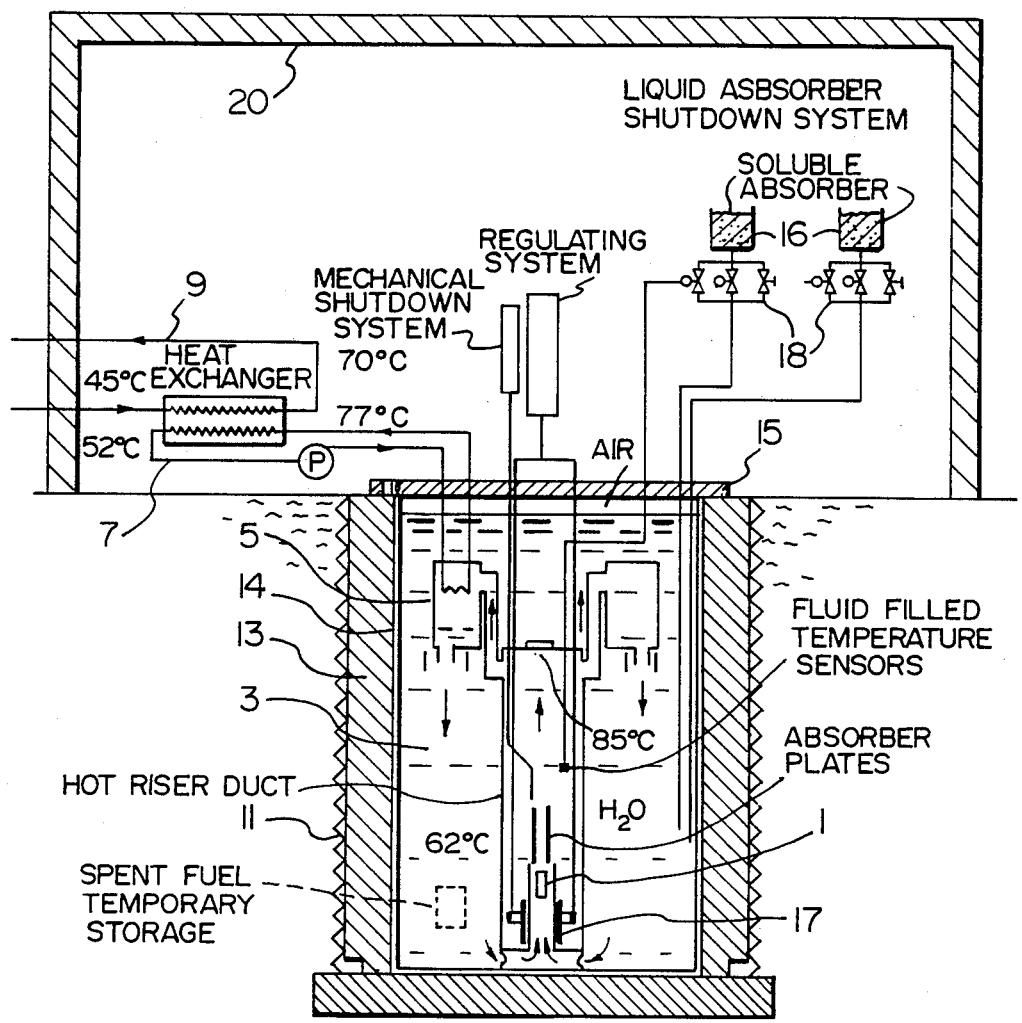
FIG. 1 shows a Canadian swimming pool reactor commonly called Slowpoke-3.

FIG. 1 shows a prototype 2 MWt Slowpoke -3 heating reactor which was described in the above mentioned article presented at the IAEA Technical Committee on Dec. 5-9, 1983.

In the figure, a core 1 consists of an anassembly of 193 Zircaloy [Trademark] clad $UO_2$ fuel elements with 5% enrichment. The fuel elements are siimlar to the CANDU power reactor fuel elements. Subcooled nucleate boiling occurs on the surface of the fuel elements at normal operating conditions with negligible void fraction due to bubbles.

The reactor is cooled by natural circulation of light water in the pool 3, which also acts as a moderator and provides radiation shielding. Two submerged plate-type heat exchangers 5 transfer heat from the pool water to a secondary water circuit 7. Plate-type heat exchangers are chosen for their compactness and low pressure drop. A secondary water circuit isolates the building water heating system 9 from any possible contamination.

The reactor pool has no penetrations and consists of an outer bolted steel liner 11, a reinforced-concrete cylindrical wall 13, and a welded inner vessel 14 of 5 mm thick stainless steel. The interspace will be monitored for leakage. A lid 15 creates an unpressurized air space above the water. This air is continuously circulated through a purification circuit. Water vapour, radioactive argon 41, radiolytic hydrogen and any released gaseous fission products are removed in the purification circuit. A wetproof catalyst developed at Chalk River Nuclear Laboratories (CRNL) of AECL recombines the hydrogen to form water. Any gaseous iodine released from a defective fuel element is collected on a charcoal filter. Radioactive argon releases are calculated to be a small fraction of that allowed. Water purity is maintained using ion-exchange columns.

Reactivity is controlled by the vertical movement of an annular beryllium reflector 17 surrounding the core or by in-core absorbers. Both the range and rate of movement of the beryllium reflector are limited by mechanical design. The reflector is controlled automatically to maintain constant water temperature at the core outlet, and periodic manual adjustment compensates for fuel burnup.

A neutron absorber solution can be added to the pool water by gravity to shut the reactor down over a period of 5 minutes. As shown in FIG. 1, the absorber solution is contained in two tanks 16, each of which has three release valves 18. This system is actuated by an abnormal temperature rise in the water and is fail-safe. Neutron sensing instruments are not required for this slow response.

The reactor building 20 is of sheet metal construction. Dampers on the building ventilation system are closed automatically by alarm signals from radiation monitors.

A core containing 5% enriched uranium will last for 3 years at a typical site. The spent fuel is then removed from its normal position and stored in the pool. After a decay period of a few weeks it can be transferred under water to a shielded shipping container.

Shutdown heat removal by conduction from the pool to the surroundings is probably sufficient, but may be supplemented by a natural circulation decay heat removal system dissipating $\approx 10$ kW to the atmosphere.

Slowpole-3 was conceived as a small, safe nuclear reactor producing hot water to heat buildings. Electricity is more readily distributed than hot water and consequently is a more marketable product if competitive. The successful development of low temperature ($\approx 100°$ C.) organic Rankine cycle engines suggest the combination of these engines or alternatives with inherently safe unattended, small nuclear reactors even though efficiencies will be relatively low.

Figure 2:
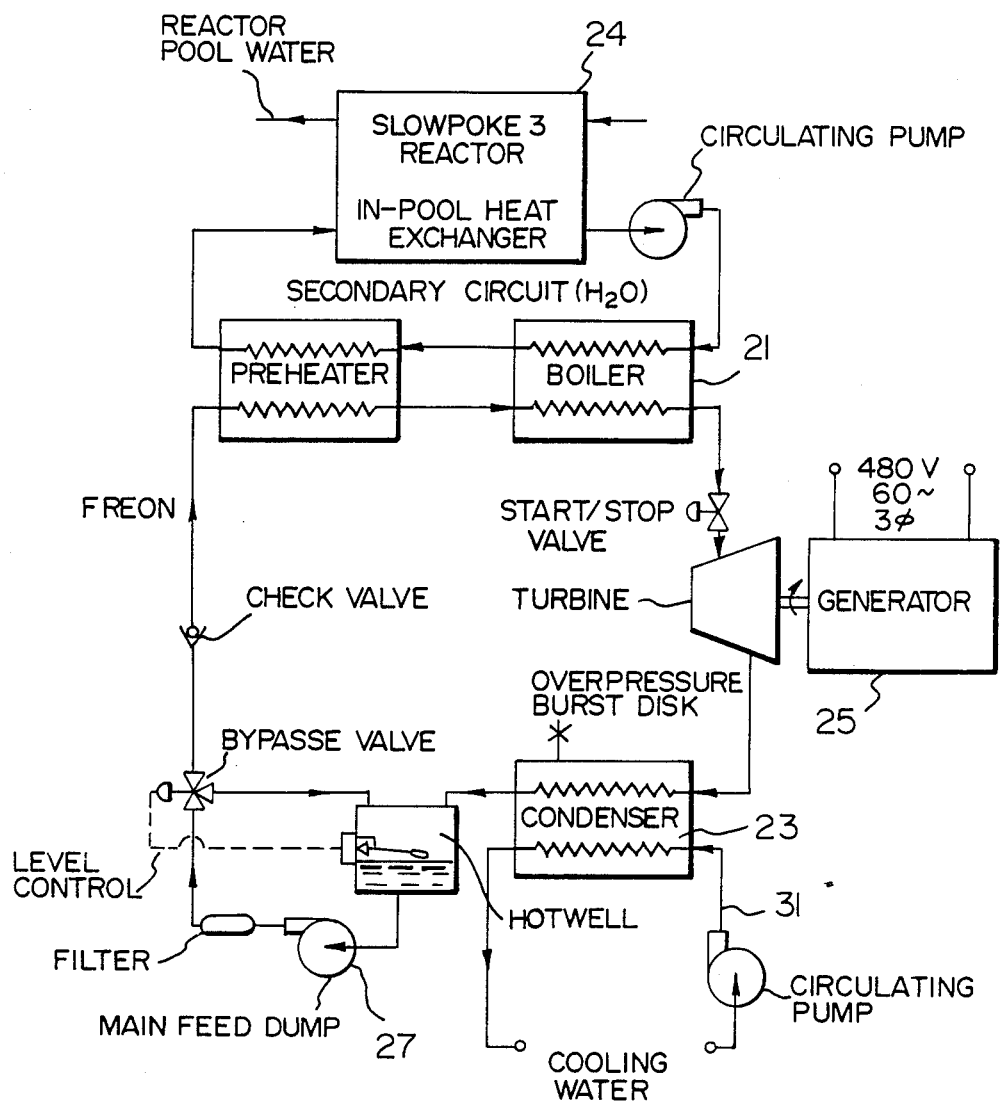
FIG. 2 is a typical Rankine cycle engine in schematic drawing.

As shown in FIG. 2, in its simplest form a Rankine cycle engine consists of a boiler 21, condense 23, turbine/generator 25, and feed pump 27. Heat from a nuclear reactor 24, or waste stream, or solar pond is used to heat the Rankine cycle fluid in the boiler, providing saturated or superheated vapour to the turbine. The fluid expands through the turbine from which power is extracted, before passing to the condenser where heat is transferred to a cooling stream 31. A feed pump raises the fluid pressure and passes the fluid to the boiler to complete the cycle.

Figure 3:
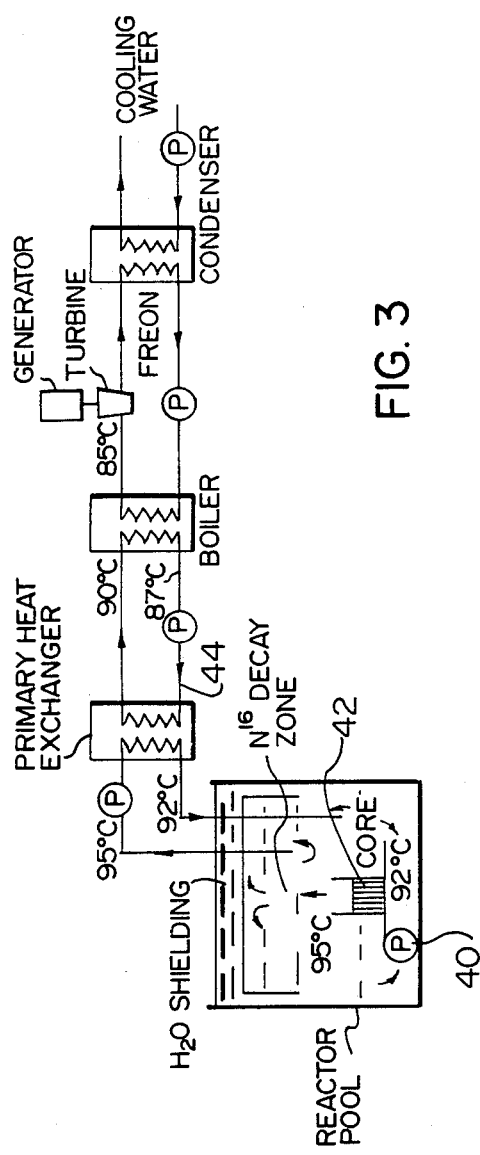
FIG. 3 shows schematically the concept of the present invention.
Figure 4:
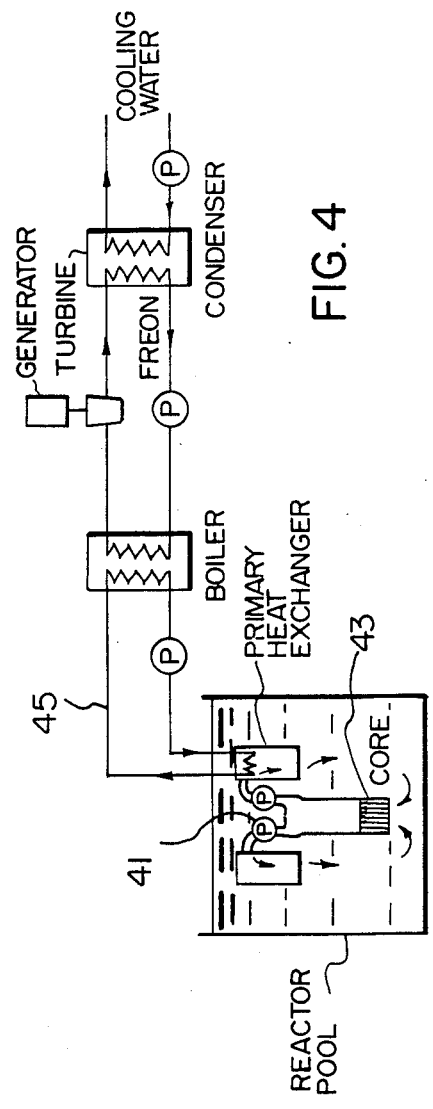
FIG. 4 shows one preferred embodiment of the present invention.

FIG. 3 and 4 show a pool reactor concept similar to Slowpoke-3 but improved to maximize electrical output. Pumping the pool water by a pump 40 or 41 through the core 42 or 43 results in a low temperature rise of this water, consequently the Rankine engine fluid (e.g. Freon 113) can evaporate at a much higher temperature that that used in Slowpoke-3 leading to improved Carnot and actual efficiency.

Other features of the circuit are used of a secondary water circuit 44 or 45 to keep Freon out of the reactor, an upper stagnant layer in the pool, and water transport delays to avoid $N^{16}$ activity problems. Hot water supplied to the Rankine cycle unit was tentatively set at 90° C. supply and 87° C. return.

Table 1 below shows the efficienceies predicted for this concept.

TABLE 1

| Cooling Medium | $H_2O$ | $H_2O$ | air |
|---|---|---|---|
| Sink Temperature | 21° C. | 3.2° C. | −33° C. |
| Net Efficiency | 9.7% | 12.8% | 16.1% |

Figure 5:
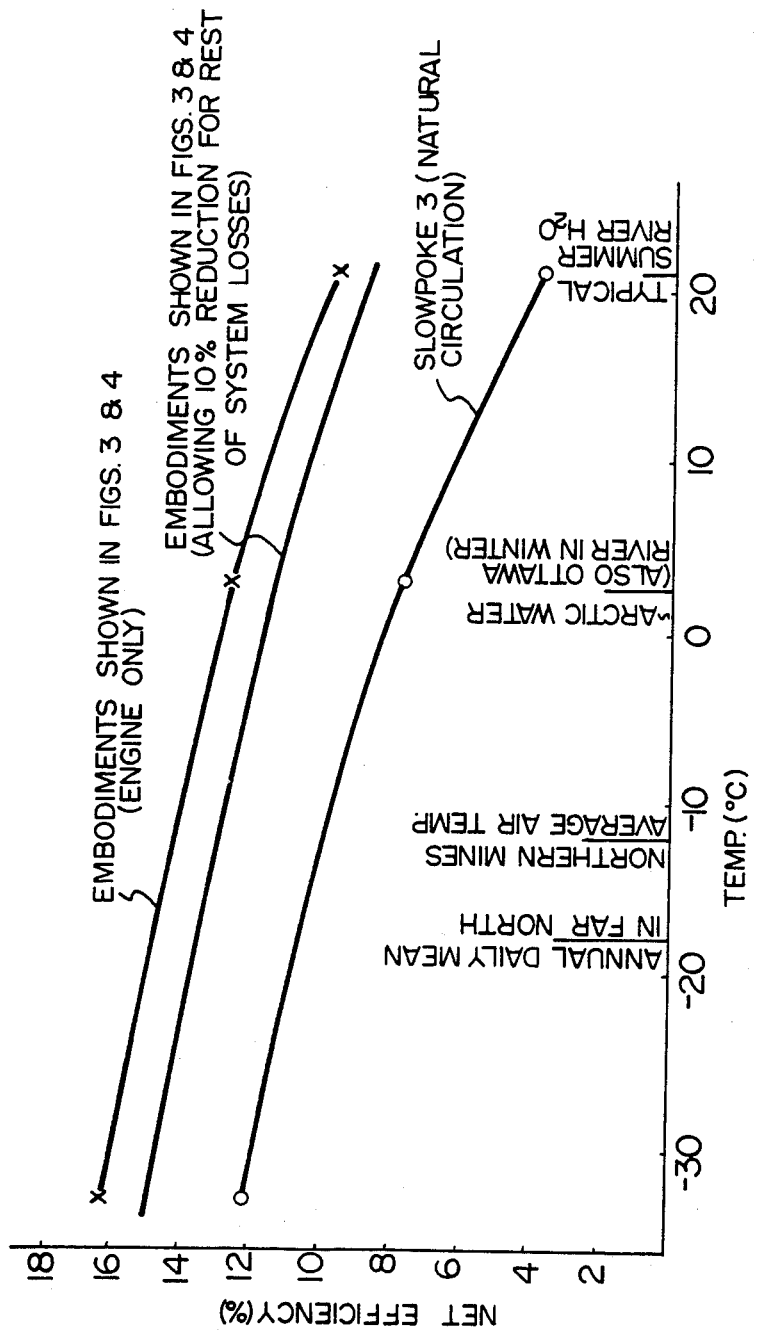
FIG. 5 is a graph indicating the efficiencies of electricity generation using Slowpoke reactor and the present invention.

FIG. 5 shows the variation of efficiency with sink temperataure for Slowpole-3 and the present invention. A 10% reduction of the engine efficiency in the present invention is reasonable to allow for additional pumping power losses. The marked improvement in efficiency for the present invention should be noted especially for warm (20° C.) heat sinks.

Figure 6:
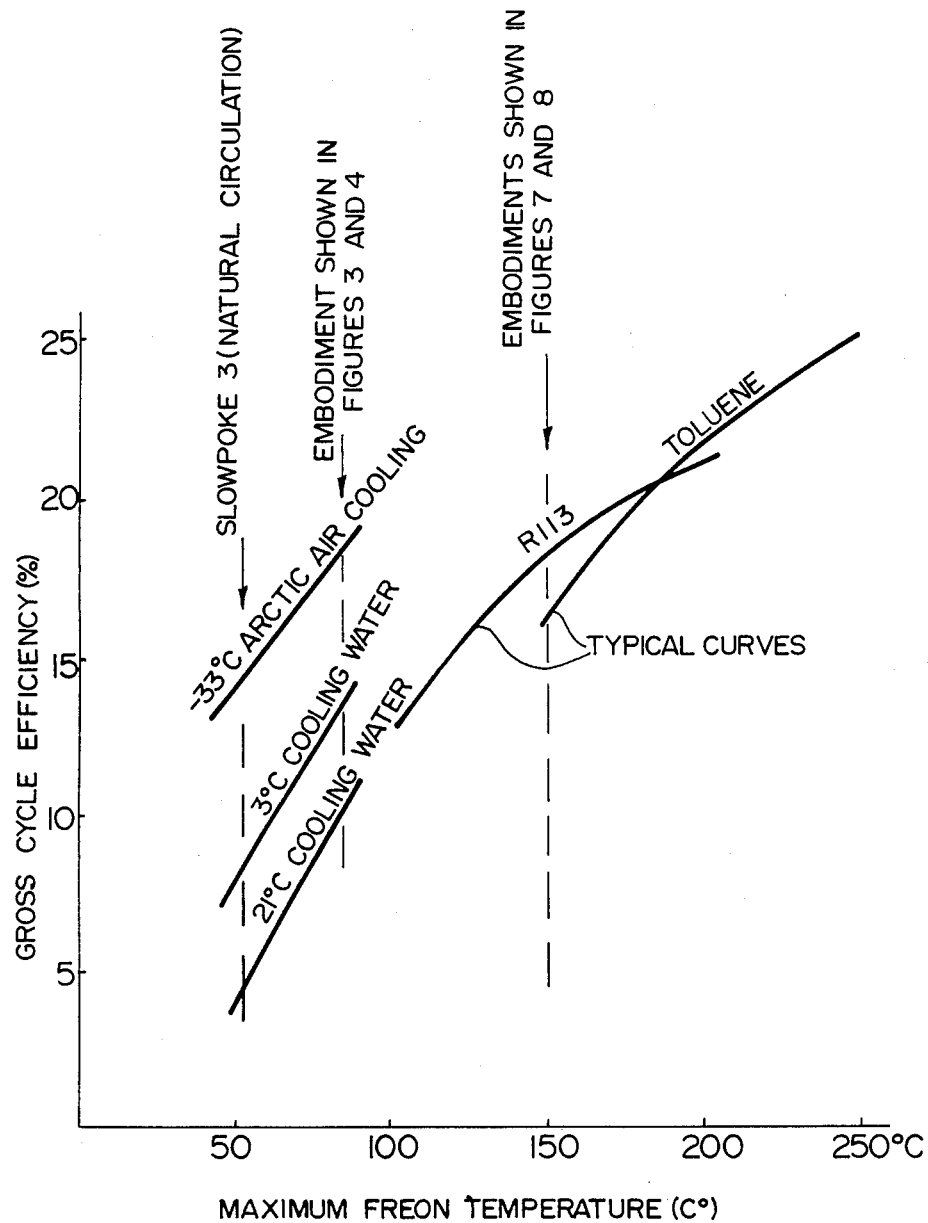
FIG. 6 is a graph showing gross efficiencies of organic Rankine cycle engines against maximum cycle temperature.

Freon refrigerants R113 and R114 were considered as working fluids, together with sink temperatures of 21° C., 3° C. and −33° C. corresponding to summer water cooling in southern Canada, winter water cooling, and Arctic air cooling respectively. The effect of using a regenerator was also considered, and in conjunction with R 113 was found to be the best compromise giving the gross efficiencies shown in FIG. 6. Parasitic pumping powers must be minimized by detail design for maximum net efficiency. A net efficiency of 10% should be achievable from a pumped-Slowpke in most of the Canadian remote communities where 3° C. cooling water is available for most of the year.

FIG. 7 shows a further preferred embodiment to advance the inventive concept described earlier in connection with FIG. 3. In the figure, a swimming pool container 61 holding a body of light water 63 and a body of poison solution 65. Due to a diference in their specific density, the light water floats on the poison solution but plates 67 may be provided at the interface in order to limit diffusion between the two liquids. A nuclear reactor core 69 is located inside a reactor chamber 71 which is immersed in the poison solution. The reactor chamber is fitted with a conventional bolted cover flange 72 made of stainless steel or Zircaloy

[Trademark]. The poison solution may contain gadolinium. A light water passage 73 and a discharge passage 75. The intake passage 73 has an intake end 77 positioned in the body of light water to take in the light water by means of a pump 79. The pump circulates forcefully the light water through the nuclear reactor core. The light water functions as a coolant as well as a moderator. The discharge passage 75 leads the heated light water from the nuclear reactor core 69 to a primary heat exchanger 81 which discharges the light water back to the body of water 63 through a main pressure restriction 83 after the heat has been transferred to the secondary water circuit 85. The discharge passage 75 and the primary heat exchanger 81 are heat insulated from the bodies of water and poison solution. In the reactor chamber 71, a shielding 87 and conventional reactor control mechanism 89 are provided to control the activities of the nuclear reactions. The primary heat exchanger 81 has the secondary water circuit 85 which is provided with a pump 91 to circulate the water therein. A boiler 93 is located in the secondary circuit to heat an organic heat exchanger fluid such as Freon [Trademark] provided in a turbine circuit 95 and circulated therethrough by a pump 97. A turbine 99 in the turbine circuit drives a generator 101 which generates electricity. A condenser 103 is located in the turbine circuit 95 to cool Freon [Trademark] in the circuit with a cooling water 105.

Appropriate means, such as valves etc, are provided on the intake passage 73 at a location 107 to introduce poison solution 65 thereinto for an emergency shutdown.

Gravity valves or other safe actuating mechanisms can be employed here. Because of the higher pressure e.g. 500 psig created by the pump 79, the reactor core can heat the moderator/coolant to about 230° C. The primary heat exchanger then transfers the heat to the secondary circuit 85 to a temperature of about 215° C. at the head of the boiler 93. The moderator/coolant discharged from the primary heat exchanger is about 90° C. which is the temperature of the body of light water in the container 61. The boiler 93 heats Freon [Trademark] in the turbine circuit from 95° C. to about 150° C.

The flow of the moderator/coolant is such that the temperature at the reactor outlet reaches 230° C. at full power and the pressure is chosen to ensure sub-cooling still exists with negligible void in the core under normal operation. A temperature rise of about 140° C. through the core results in a comparable temperature reduction on extraction of the heat in the Rankine engine boiler 93. With steam as the Rankine fluid, a low cycle efficiency would result with evaporation at near 85° C., and with Freon [Trademark] a much higher evaporation temperature e.g. 150° C., is obtained since much of the heat is transferred during the preheat portion before boiling. Net efficiency of about 20% is achievable for this preferred embodiment, low reactor water flow giving low parasitic power consumption. The design of the core region is more complex than for an unpressurized system. Locating the flange 72 more than 3 feet from the core would minimize neutron dose therethrough. Infrequent refueling (e.g. every few years) make this arrangement more viable.

The power of the pump 79 in the intake passage is about 3% of the electrical output, hence a simple static orifice, as the main pressure restriction 83 at outlet is acceptable rather an a energy saving expander.

The discharge passage 75 must be well heat insulated in order to reduce heat losses due to nucleate boiling. Double piping is one obvious solution while local stagnant water layers inside the reactor cover flange or other alternate can be employed here. The core temperature rise $\Delta T$ (140° C.) is approximately one fifth of our above referenced Slowpoke-3 core $\Delta t$, (surface boiling being the heat removal mechanism from the fuel), consequently velocity is reduced proportionately and parasitic power losses are acceptable. In place of conventional heat exchanger, a plate heat exchanger can handle low flow quite well as the primary heat exchanger. More pressure drop can be accepted for a pumed scheme leading to smaller heat exchangers if desired. The mean core temperature is higher than in Slowpoke-3 resulting in larger ractivity change due to temperature change.

On pump rundown, pressure will reduce and bulk boiling will occur initially at the lowest pressure (high point), or at a high heat flux area (core). Ideally the reactor should partially void reducing power due to negative void coefficient without instabilities or burnout occuring. One alleviating measure which has been considered is shown in FIG. 8. In that figure, another preferred embodiment is shown as having the primary heat exchangers mounted below the nuclear core.

Ultimate shut down can be assured by poison injection. The system shown in FIG. 7 uses gadolinium solution and a redundant number of gravity operated flapper valves which are manually closed at start-up. Gadolinium injection only occurs at the end of the transient with the embodiment shown in FIG. 7 but mechanisms for inherent triggering of the valves on 10% flow or pressure reduction can be devised if necessary. The gadolinium solution fills the lower half of the pool container 61, with the upper part and pumped circuit full of unpoisoned water. Plates 67 could be provided to limit mixing and diffusion while a purification system 109 similar to the Slowpoke-3 system would be used to clean up following a poison shut down.

The secondary water circuit 85 is provided to isolate Freon in the turbine circuit from the reactor pool container.

In FIG. 8, another preferred embodiment is shown. In this embodiment, a primary heat exchanger 111 is mounted below the reactor core 113 in a pool container which holds a body of light water as the moderator/coolant. The gadolinium poison solution is contained pressurized in an injection system 115 and is adapted to be injected into an intake passage 117 through valves 119 which are designed to be activated on 10% pressure or flow reduction. This arrangement overcomes any diffusion, pH, or other design problems of FIG. 7, yet still ultimately shuts down the reactor on in-reactor piping failure. Minimizing unwanted shut downs would required duplicating pumps and a reliable power supply. A pump 121 is provided in the intake passage and is mounted externally to the container to ensure easy access for maintenance. Pressure restriction means 122 at the heat exchanger 111 has a cross section smaller than that of the remaining portion of the coolant moderator passage. The location of the primary heat exchanger ensures the voiding occurs at the core first in the event of the pump run down. A beryllium slab reflector 123 shown in the figure controls reactivity of the reactor. Alternative horizontal reactivity mechanisms are also shown at 125. This may simplify fuel handling and the bolted flange assembly of FIG. 7.

While FIG. 8 shows a different embodiment, operating characteristics, such as temperatures of the moderator-coolant light water at various points along the passage, are similar to those shown in FIG. 7, resulting in the comparable net efficiency.

We claim:

1. In a swimming pool type nuclear reactor, a thermodynamic system for converting heat produced by the reactor to a more useful form of energy, comprising:

a pool containing light water functioning as a moderator-coolant-shielding for the reactor and being open to atmospheric pressure;

moderator-coolant passage means having an intake end and a discharge end and defining a flow of the moderator-coolant between the ends, the both ends and a substantial part of the passage means being positioned in the pool;

the said discharge end having pressure restriction means;

a nuclear reactor core containing a fissionable material, the said reactor core being positioned inside the pool and located in the moderator-coolant passage means;

pump means provided in the passage means near the said intake end, the said pump means, in cooperation with the said pressure restriction means to circulate the light water contained in the pool through the passage means under an appropriately sufficient pressure so that the light water is heated above 100° C. but the surface subcooled nucleate boiling is still maintained in the reactor core;

primary heat exchanger means in the moderator-coolant passage means between the reactor core and the discharge end to transfer heat energy of the light water to a heat exchanger fluid contained in a secondary circuit, the said primary heat exchanger means being located in the pool;

boiler means provided in the secondary circuit to heat an organic fluid contained in a turbine circuit;

turbine means being provided in the turbine circuit so that the heated organic fluid drives the turbine means;

condenser means in the turbine circuit to condense the heated organic fluid; and an electric generator connected to the turbine means to be driven thereby to generate electricity.

2. The thermodynamic system according to claim 1 wherein: the pump means is provided in a part of the passage means located outside the pool near the intake end to draw the light water from the pool and circulate it under pressure through the passage means and back to the pool by the discharge end.

3. The thermodynamic system according to claim 2 wherein: the said primary heat exchanger means is located below the reactor core.

4. The thermodynamic system according to claim 3 further comprising:

poison solution tank means containing a poison solution under pressure higher than atmospheric pressure, and injection means provided on the passage means to inject the poison solution thereinto.

5. The thermodynamic system according to claim 4, wherein:

the heat exchanger fluid is light water and the organic fluid is Freon [Trade Mark].

* * * * *